United States Patent [19]
Steere, Jr. et al.

[11] Patent Number: 5,848,298
[45] Date of Patent: Dec. 8, 1998

[54] SYSTEM HAVING TWO PC CARDS IN A HINGED CARRYING CASE WITH BATTERY COMPARTMENT WITHIN IN THE HINGE SECTION

[75] Inventors: Daniel C. Steere, Jr., Folsom; Homer T. Gee, Roseville; Walter S. Matthews, Folsom, all of Calif.

[73] Assignee: Intel Corporation, Santa Clara, Calif.

[21] Appl. No.: 861,097

[22] Filed: May 21, 1997

Related U.S. Application Data

[63] Continuation of Ser. No. 391,133, Feb. 21, 1995, abandoned.

[51] Int. Cl.$^6$ ........................................... G06F 13/00
[52] U.S. Cl. ..................... 395/882; 395/892; 395/893
[58] Field of Search ................... 235/280, 472, 235/486, 382, 492; 340/825.06; 364/705.02, 707, 708.1; 380/23; 395/893, 882, 892; 361/679, 680, 681, 683, 729

[56] References Cited

U.S. PATENT DOCUMENTS

| | | | |
|---|---|---|---|
| 4,814,591 | 3/1989 | Nara et al. | 235/280 |
| 5,233,547 | 8/1993 | Kapp et al. | 364/705.02 |
| 5,293,424 | 3/1994 | Holtey et al. | 380/23 |
| 5,335,557 | 8/1994 | Yasutake | 73/862.043 |
| 5,373,149 | 12/1994 | Rasmussen | 235/492 |
| 5,451,933 | 9/1995 | Stricklin et al. | 340/825.06 |
| 5,486,687 | 1/1996 | Le Roux | 235/382 |
| 5,500,517 | 3/1996 | Cagliostro | 235/486 |
| 5,521,369 | 5/1996 | Kumar | 235/472 |
| 5,522,089 | 5/1996 | Kikinis et al. | 395/893 |

OTHER PUBLICATIONS

D. Chaum, "Untraceable Electronic Mail, Return Address, and Digital Pseudonyms" Comm. of the ACM, 24(2), Feb. 1981, pp. 84–88.

A. Fujioka, "A Practical Secret Voting Scheme for Large Scale Elections", Adv. in Cryptology—Auscrypt '92, 1992, pp. 244–251.

C. Park, "Efficient Anonymous Channel and All/Nothing Election Scheme", Adv. in Cryptology—Auscrypt '93, pp. 248–259.

A. Fiat, "How to Prove Yourself: Practical Solutions to Identification and Signature Problems" Adv. in Cryptology—Crypto '86, Springer–Verlag, 1986, pp. 186–199.

B. Pfitzmann "Breaking an Efficient Anonymous Channel" Proc. Eurocrypt 94, pp. 339–348.

M. Noar "Bit commitment Using Pseudo–Randomness" in Adv. in Cryptology—Crypto '89, 1989, pp. 128–136.

Y. Desmedt, "Threshold Cryptosystems", Adv. in Cryptology—Crypto '89, 1989, pp. 307–315.

*Primary Examiner*—Thomas C. Lee
*Assistant Examiner*—Chien Yuan
*Attorney, Agent, or Firm*—Blakely, Sokoloff, Taylor & Zafman

[57] ABSTRACT

A companion computer system for a host computer wherein the host computer includes an interface for electrically and mechanically interfacing to the companion computer. An example is a PCMCIA slot. The companion system includes a PC card with an interface which mates with the interface on the host. A bus is located on the PC card. A CPU is located on the PC card and connected to the bus. A display is located on the PC card and connected to the bus. An input device is located on the PC card and connected to the bus. A non-volatile memory module is located on the PC card and connected to the bus. A low power random access memory module is located on the PC card and connected to the bus. A power supply is located on the PC card and connected to the components of the PC card An operating system is located in the non-volatile memory.

2 Claims, 10 Drawing Sheets

SYSTEM HAVING TWO PC CARDS IN A HINGED CARRYING CASE WITH BATTERY COMPARTMENT WITHIN IN THE HINGE SECTION

This is a continuation of application Ser. No. 08/391,133, filed on Feb. 21, 1995, now abandoned.

CROSS-REFERENCE TO RELATED APPLICATIONS

Please refer to application Ser. No. 08/391,110 filed on Feb. 21, 1995 by Steere et al, now U.S. Pat. No. 5,619,396.

BACKGROUND OF THE INVENTION

1. Field of the Invention

The subject invention relates to small form factor stand alone computers. More particularly, it relates to the use of a complete but limited printed circuit card ("PC card") based computer as a companion to a larger more capable host computer.

2. Description of the Prior Art

Very small computers, sometimes called personal digital assistants, have been discussed for some time and are now reaching the market. These devices are used to carry personal calendars, address and phone numbers and the like and often have a modem for communication over a telephone network. The personal digital assistants are currently the smallest portable computer. They measure approximately 6 inches by 4 inches by 1 inch However, for some applications, they are still quite large. As small as PDA's are, there is substantial utility to having an even smaller stand alone computer. For example, a computer that would fit into a shirt pocket and be not much larger than a few credit cards. Furthermore, communication with a desk top PC while possible is awkward. It requires special cables with special connectors.

OBJECTS AND SUMMARY

It is therefore an object of the present invention to provide a portable computer that is a companion to a desk top computer that is substantially smaller than the personal digital assistants.

It is another object of the invention to provide a portable computer in a PCMCIA format.

It is yet another object of the present invention to provide a portable computer using flash memory as ROM and SRAM for all data input storage and calculating.

It is another object of the present invention provide a computer the size of a PCMCIA card with an alpha numeric input device.

It is another object of the invention to provide a computer the size of a PCMCIA card with a mouse like curser movement capability.

It is another object of the invention to provide a stand alone computer the size of a PCMCIA card with a video screen.

It is another object of the invention to provide a power supply for a stand alone computer the size of a PCMCIA card that is rechargeable from a PCMCIA slot.

It is another object of the invention to provide a protective case for conveniently storing a stand alone computer system the size of a PCMCIA card when the card is not in the host.

It is another object of the invention to provide a protective case for conveniently storing a stand alone computer system the size of a PCMCIA card when the card is not in the host and which uses the sixty-eight pin connector to mechanically attach the card to the case.

It is another object of the invention to provide a protective case for conveniently storing a stand alone computer system the size of a PCMCIA card when the card is not in the host and which uses the sixty-eight pin connector to mechanically attach the card to the case and which has a battery compartment and electrical connection for connecting an external battery to the card as a source of power therefore or a recharger for a battery on the PCMCIA card.

Finally, it is an object of the invention to provide a combination carrying case and multi-card dock.

These and other objects of the invention are achieved by a companion computer system for a host computer wherein the host computer includes an interface for electrically and mechanically interfacing to the companion computer. An example is a PCMCIA slot. The companion system includes a PC card with an interface which mates with the interface on the host. A bus is located on the PC card. A CPU is located on the PC card and connected to the bus. A display is located on the PC card and connected to the bus. An input device is located on the PC card and connected to the bus. A non-volatile memory module is located on the PC card and connected to the bus. A low power random access memory module is located on the PC card and connected to the bus. A power supply is located on the PC card and connected to the components of the PC card An operating system is located in the non-volatile memory.

In addition, an encryption means may be connected between the connector and the bus to insure the proper access to the PC card system. Also, a battery charger may be located on the PC card and connected between the battery and the second connector and adapted to recharge the battery when the PC card is connected to the host. Also, a row of matrix switches may be placed adjacent one dimension of the display for moving a cursor on the display a fixed distance in a direction parallel to the first dimension in response to the movement of the user's finger or a pencil/pen across that row of matrix switches, and a second row of matrix switches may be located adjacent a second dimension of the display where the second dimension is substantially orthoginal to the first dimension. The second row of matrix switches move the cursor on the display a fixed or variable distance in a direction parallel to the second dimension in response to the movement of the user's finger or pencil/pen across that row of matrix switches. The distance may vary depending on the speed of movement of the finger.

A case for the companion system comprises a hinge having one side connected to a connector substantially identical to the connector in the host and the other side connected to a cover having a form factor substantially similar to that of the PC card. A battery compartment may be located adjacent to the cover and electrically connected to the PC card through the third connector when the second and third connector are mated.

BRIEF DESCRIPTION OF THE DRAWING

The preferred embodiments of the invention will now be described in conjunction with the Drawing, wherein.

DETAILED DESCRIPTION OF THE PREFERRED EMBODIMENT

The preferred embodiment of the present invention is a fully functioning stand alone computer in a PCMCIA form factor. The PCMCIA (Personal Computer Memory Card International Association) standard was developed for providing user installed memory and I/O functions for small form factor digital computer systems. The standard specifies a card containing a printed circuit board. This product is usually referred to as a PC card. There are three PC card formats: Types I, II and III. All three have external dimensions of 54 millimeters by 85.6 millimeters. Thicknesses vary. Type I is 3.3 millimeters thick. Type II is 5 millimeters thick and Type III is 10.5 millimeters thick. The standard specifies a 68 pin connector on one end. The PC card plugs into a socket in the host computer. That is, the 68 pin connector plugs into a mating connector mounted on a header which is in turn mounted to a mother board or daughter board located inside the host. The host provides the power to run the functionality of the PC card.

While the preferred embodiment will be described by using the PCMCIA interface standard, the invention herein applies equally to the smart card interface, a RS 232 serial interface or a parallel interface to a host computer. As used in herein, the term interface means at least an electrical and mechanical connector conforming to a published specification therefor. In addition, it may include a physical size specification so that the entire system will fit into a specified space. Examples of such standards are the PCMCIA standard and Smart Card standard. The RS 232 serial interface standard and the parallel interface standard are a connector and data protocol standards only. Physical dimensions of the systems to be interfaced are not specified.

Figure 1:
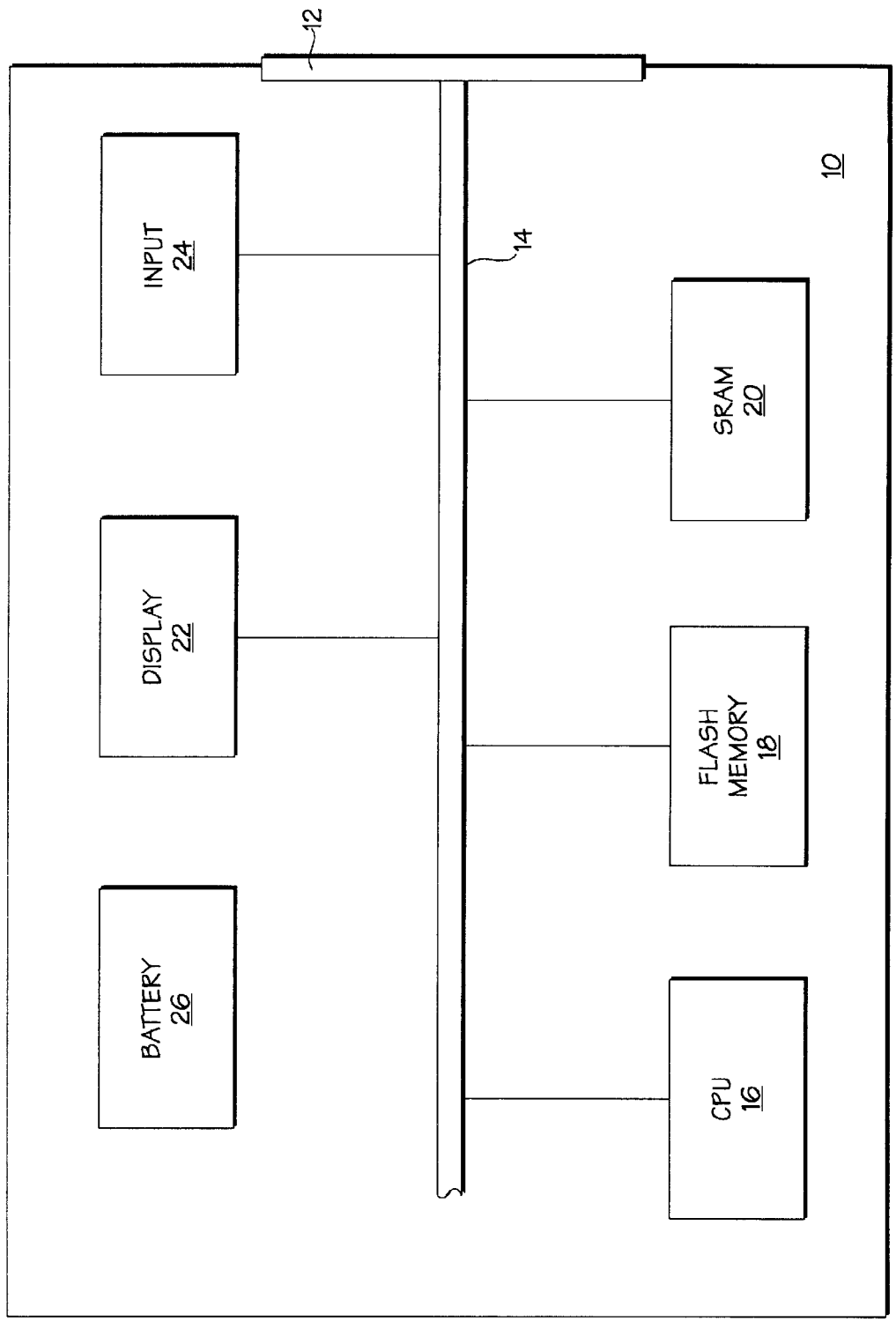
FIG. 1 is a block diagram of the basic system architecture of the present invention.

FIG. 1 is a block diagram of the basic system architecture of the present invention. Referring now to FIG. 1, reference numeral 10 indicates a PCMCIA card. A mechanical and electrical interface 12 connects bus 14 to the host's bus (not shown). Interface 12 may be a 68 pin connector and bus 14 may be the PCMCIA specified bus or a different bus such as ISA bus or the 186 AD bus.

CPU 16 is connected to bus 14. A suitable CPU is microcontroller model 80C/86EB manufactured by Intel Corporation.

Flash memory module 18 is connected to bus 14. A typical flash memory module is model PA28F800BX-TL80 manufactured by Intel Corporation.

Static random access memory ("SRAM") module 20 is connected to bus 14. A typical SRAM module would be 32 k bytes or 64 k bytes in capacity. A suitable SRAM memory module would be KMB681000ALT-8 manufactured by Samsung.

A display device 22 is also connected to bus 14. Device 22 is a liquid crystal display ("LCD") measuring approximately 58 mm by 34 mm and having either 140 lines and 240 columns or 144 lines and 256 columns. As is well known, LCD's are very low power devices. A suitable device is Model is manufactured by Seiko-Epson.

An input device 24 is also connected to bus 14. In general, the preferred input device is a set of keys capable of handling alpha numeric data. In particular, the preferred device is a resistive touch panel which is integrated with the LCD display.

Battery 26 provides power to run all of the components on card 10. Either a primary or a secondary battery could be used. The specific connections of battery 26 to the various components are well known and are not shown to avoid clutter.

In operation PCMCIA card 10 performs in two separate modes. When the PCMCIA card is not plugged into a PCMCIA slot in a host computer, it is a stand alone computer. This means that it has a CPU, memory, an input device, an output device, its own power and a software operating system (not shown).

Because the PC card must fit into a PCMCIA slot, its dimensions are well defined, unalterable and very small. Because of the small volume into which all components must fit, the battery must be very small. This means that the computer will have a very small power budget. In stand alone mode, the computer will be used to access and update various data bases such as phone directories, appointment calendars, etc. This means it will be turned on, used for a few minutes and then turned off. In order to be useful, the computer must have a battery life of at least one day under this usage pattern.

In general, the power available from battery 26 is insufficient to either write or erase data from flash memory module 18. However, battery 26 does provide enough power to read flash memory module 18, to run CPU 16, LCD display 22 and SRAM 20. Accordingly, flash memory is used as read only memory ("ROM") while PCMCIA card 10 is operating in the stand alone mode. All memory to support computing in the stand alone mode is provided by SRAM 20. Thus, any changes to data bases which have been downloaded are stored in SRAM 20 until card 10 is returned to its host.

In the second mode, card 10 is located within a host computer. In this mode, power is supplied by the host and is sufficient to write and erase flash memory module 18. In use, data bases such a phone directory, or an appointment calendar that are routinely kept on the host are down loaded into flash memory 18. Any changes to these data bases entered into SRAM when the card was used as a stand alone computer are up loaded by the host from SRAM 20 into the host's data base and also into flash module 18. Thus, when card 10 is plugged into the host, the data in both are mutually updated so that they are the same.

Flash memory module 18 contains the operating system, all applications software and all data for the applications. The data is current in the host, flash and SRAM when card 10 is within its host. When card 10 is operating in stand alone mode, all new input is stored in SRAM 20. Thus, if battery power fails while in stand alone mode, a new battery may be inserted and normal operation continued without returning to the host. However, any new data entered into SRAM 20 will be lost.

Figure 2:
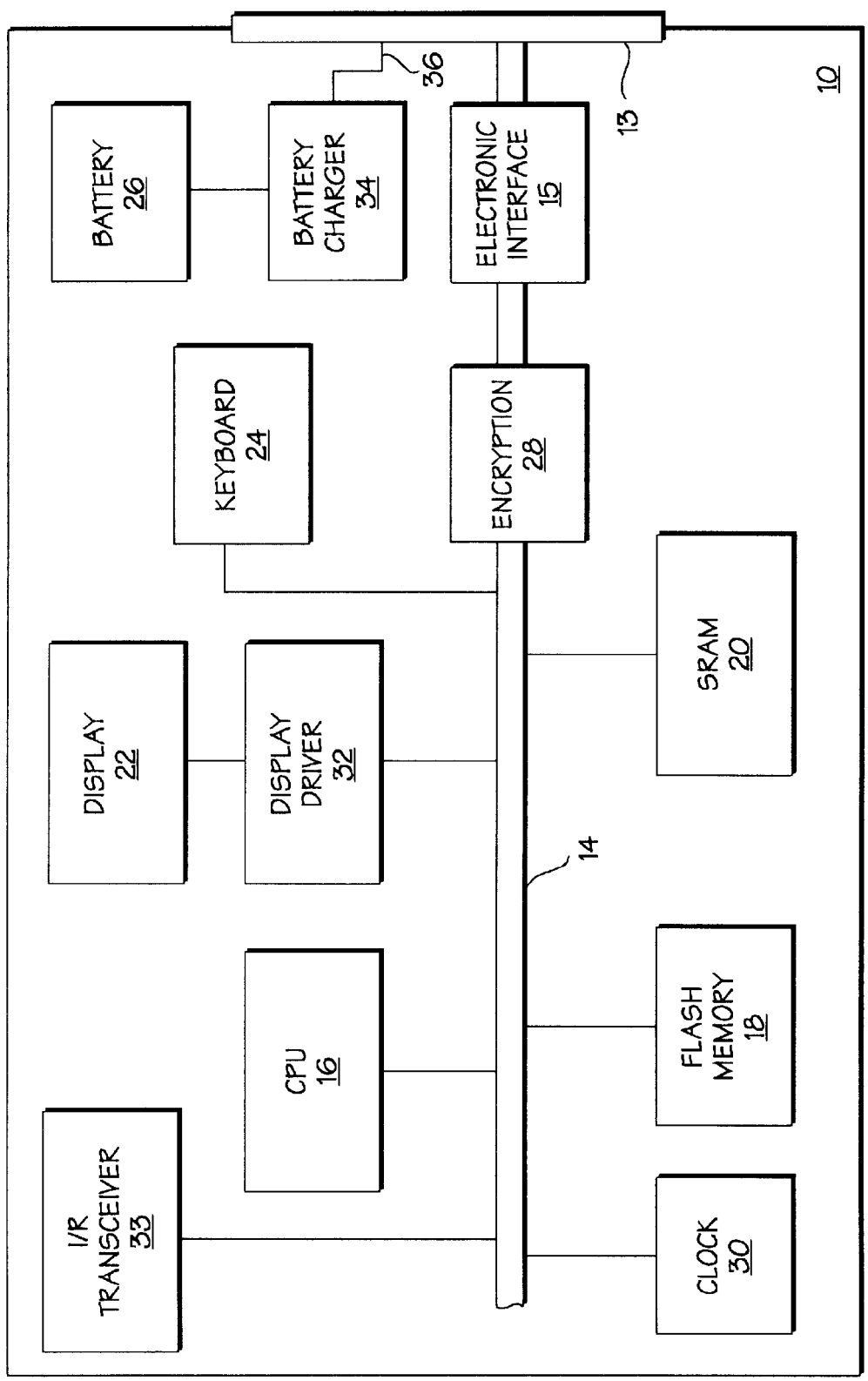
FIG. 2 is a more detailed block diagram of the basic system architecture which also includes additional features.

FIG. 2 is a block diagram of a somewhat more complex system. Common reference numerals with FIG. 1 refer to the same components. Referring now to FIG. 2, sixty eight pin socket 13 is the mechanical interface between the host bus and bus 14 of card 10. It is connected to electrical portion 15 of the interface. In this case, the electrical portion of the interface consists of a 4 k buffer of dual ported SRAM. Alternatively, some of all of SRAM 20 may be made dual ported and connected so as to perform the buffering operation. Electrical interface 15 is connected directly to an encryption device 28. The purpose of encryption device 28 is to limit access to card 10 to authorized persons or machines. Encryption hardware and software are combined to provide cryptographic hash functions, bulk encryption, digital signal algorithms, random and pseudo random number generation and secure storage.

A system clock 30 is connected to bus 14. A system clock is useful for allowing applications programs to accurately keep track of current time and execute actions at programmed times such as to turn on the card and send an alarm.

A display driver 32 is connected between display 22 and bus 14. Display driver 32 is shown here to more fully describe the display subsystem and in well known in the art.

An infrared ("I/R") transceiver 33 is connected to bus 14. I/R transceiver 33 provides a wireless data communication interface which is useful over short distances for communication with a printer, a host computer or controlling some other device.

A battery charger 34 is connected to battery 26 and is connected via lead 36 to sixty-eight pin connector 12. In this embodiment, battery 26 is rechargeable and is automatically recharged each time card 10 is inserted into the PCMCIA socket in the host. This has the advantage of removing the responsibility from the user for having a fully charged battery when card 10 is removed from the host.

Figure 3:
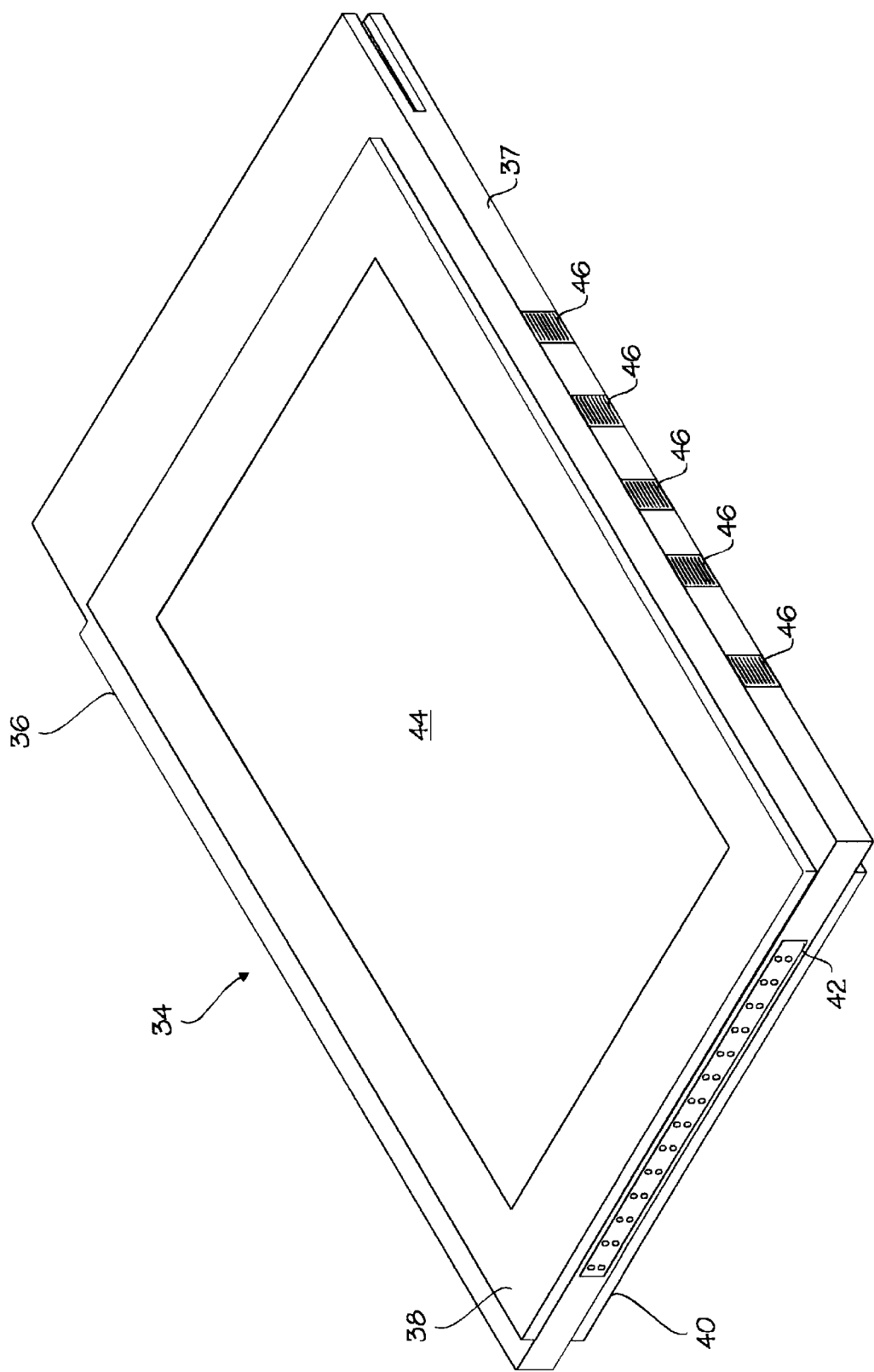
FIG. 3 is a perspective view of one physical arrangement of the invention with a viewing screen on the raised area of a Type II PCMCIA card and with input device keys on the card guide area of the PCMCIA card.

FIG. 3 is a perspective view of one physical arrangement of the invention with a viewing screen on the raised cover of a Type II PCMCIA card and with input device keys on the card guide area of the PCMCIA card. Referring now to FIG. 3, PCMCIA card 10 consists of a frame 36 to which are attached a top cover 38 and a bottom cover 40. A printed circuit board (not shown) is positioned between covers 38 and 40 and supported by frame 36. Socket portion 42 of sixty-eight pin connector 12 is connected to the printed circuit board. Top cover 38 is cut away leaving an opening for LCD display 44. LCD display 44 has 140×240 pixel display capable of displaying graphics. LCD display 44 is attached mechanically either to the printed circuit board beneath cover 38 or to frame 36, is electrically connected to the printed circuit board and operates within the computer system of the PC card as shown in FIGS. 1 and 2.

Switches 46 are imbedded in the rail portion 37 of frame 36. Switches 46 are either capacitive or resistive. Rail portion 37 is that portion of frame 36 which makes sliding contact with the PCMCIA socket in the host. Switches 46 allow alpha numeric input to the system. Switches 46 can be organized to allow cording with which the entire alphabet may be encoded with 5 keys. Additional keys may also be placed on the opposite side of card 10. An on/off switch may be a combination of one switch on both sides. In this embodiment, turning the system either on or off would require touching the proper switches on both sides of card 10 simultaneously. This would minimize the risk of turning on the card accidentally.

Figure 4:
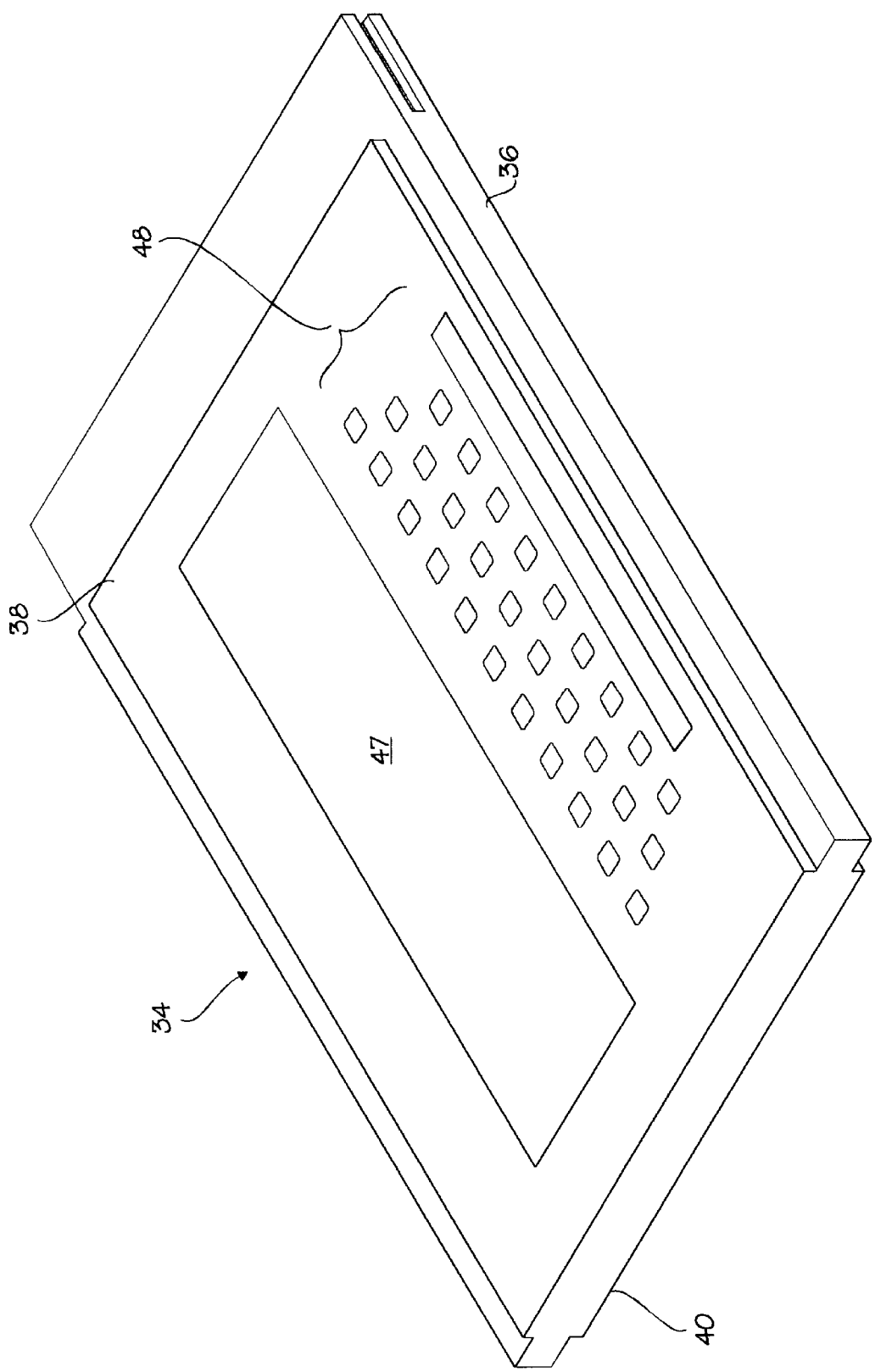
FIG. 4 is a perspective view of one physical arrangement of the invention with input device keys on the raised surface area of a type II PCMCIA card adjacent to a viewing screen.

FIG. 4 is a perspective view of another physical arrangement of the invention with input device keys on the raised surface area of a type II PCMCIA card adjacent to a viewing screen. Common reference numerals among various Figures refer to the same element. Referring now to FIG. 4, cover 38 of PCMCIA card 10 contains a cut away portion for LCD display 47 and qwerty keyboard 48. LCD display 47 has 240 lines and 60 columns per line. Both LCD display 46 and qwerty keyboard 48 are attached mechanically either to the printed circuit board beneath cover 38 or to frame 36. Both are electrically connected to the printed circuit board and operate within the computer system of the PC card as shown in FIGS. 1 and 2. Additional switches could be placed along frame 36 as shown in and described in connection with FIG. 3. These switches could be used for an on off switch or function keys.

Figure 5:
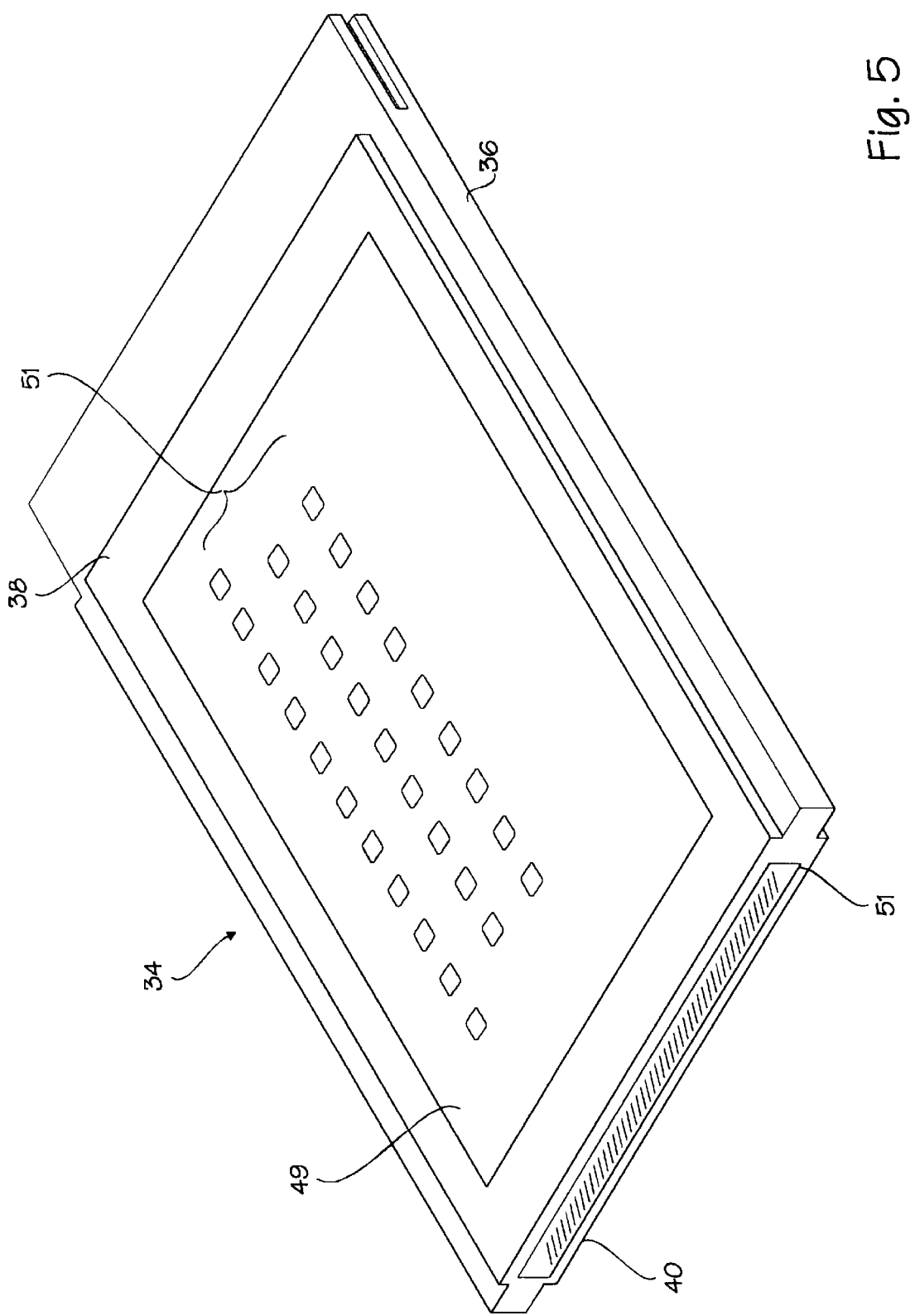
FIG. 5 is a perspective view of one physical arrangement of the invention with input device keys built into the viewing screen which is positioned on the raised area of a type II PCMCIA card.

FIG. 5 is a perspective view of another physical arrangement of the invention with input device keys built into the viewing screen. Referring now to FIG. 5, a touch screen LCD display 49 is attached either to frame 36 or the printed circuit board, is electrically connected to the printed circuit board and operates in the system as shown in FIGS. 1 and 2. Touch screen 50 contains a qwerty keyboard 50 which is activated by touching the portion of the screen identified with a particular character with either a finger or some other stylus type object such as a pen or pencil. Touch screens are well known in the art, and a suitable models manufactured by Seiko-Epson. A transmission window 51 for I/R transceiver 33 fits into the end of frame 36 in place of socket 42. Additional switches could be placed along frame 36 as shown in FIG. 3. As with the embodiment of FIG. 4, these switches could be used for an on off switch or function keys.

Figure 6:
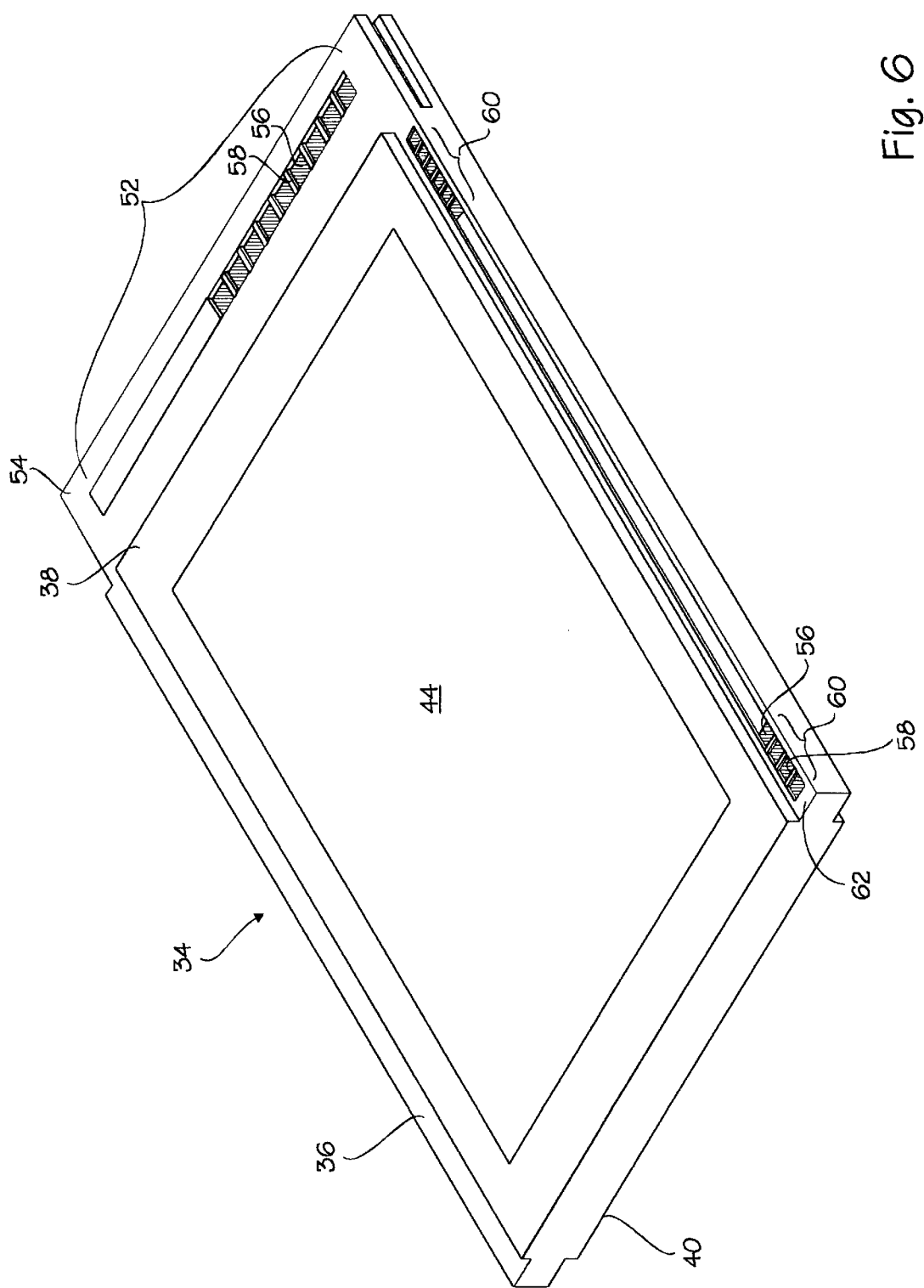
FIG. 6 is a perspective view of one physical arrangement of viewing screen positioned on the raised area of a type II PCMCIA card and two series of touch switches for moving the cursor on the viewing screen.

FIG. 6 is a perspective view of another physical arrangement of card 10. Referring now to FIG. 6, a row array of capacitive or resistive touch switches 52 are located along the short dimension of PC card 10. This is the same dimension as the short or vertical dimension of display 44. Touch switch array 52 may be mounted on surface 54 adjacent to top cover 38. Touch switch array 52 consists of a large number of individual switches 56 separated from each other by spaces 58. A second set of touch switches 60 runs along the long dimension of display 44 on surface 62. This is the same dimension as the long or horizontal dimension of display 44. Touch switches 60 also consist of a series of individual switches 56 separated from each other by spaces 58. Touch switches 52 and 60 are connected to the printed circuit board surrounded by frame 36 and covers 38 and 40. In operation, switches 52 and 60 simulate a mouse or track ball. Running a finger or stylus along switches 52 simulates movement in the vertical direction as movement of the finger from one switch 56 to an adjacent switch 56 causes the curser to move across the screen a fixed distance. The distance that the curser moves when the finger moves between adjacent switches is predetermined but variable. That is, the distance can be set such that the cursor moves across the entire screen with one full swipe from end to end of array 52. Or the distance relationship could be set such that a full swipe across array 52 moves the cursor ¼ or ½ of the distance across the screen. Alternatively, the distance that the cursor moves across the screen as a finger or stylus moves from one switch 56 to an adjacent switch 56 can vary according to the speed that the user's finger or stylus moves across the switches. For example, as the movement of the finger speeds up, the cursor movement will speed up by 1.5 times the increase in movement of the user's finger.

In a like manner, running a finger or stylus along switches 60 simulates movement in the horizontal direction.

An alternative embodiment uses only one line array of switches—for example line array 66—and a function switch located along rail 37. In this embodiment, movement of a finger along the line array moves the cursor along one direction when said function key is contacted during the movement the finger and in an orthoginal direction when the function key is not contacted during the movement.

Another alterative embodiment uses a two dimensional array of matrix switches. This would allow a more general movement of the cursor. For example, a 16 switch square array could be used.

Figure 7:
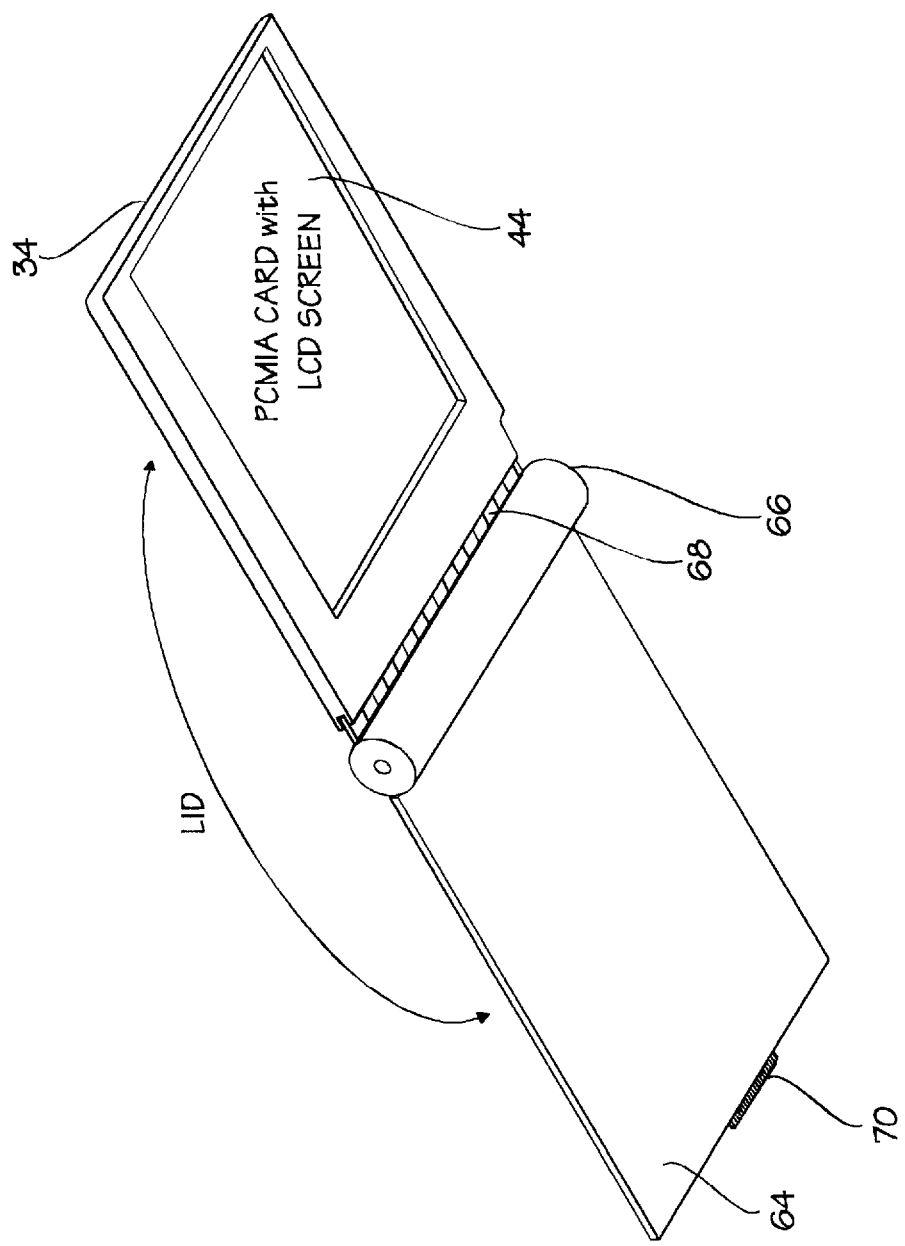
FIG. 7 is a perspective view of a carrying case with lid for storing a stand alone PCMCIA card system while the system is not in a host.

FIG. 7 is a perspective view of a cover or lid for storing a stand alone PCMCIA card system while the system is not in a host. Referring now to FIG. 7, a lid 64 having substantially the same form factor as PCMCIA card 10 is connected along one narrow dimension to a hinge 66. A PCMCIA sixty-eight pin connector 68 is attached to hinge 66 such that the socket portion which is mounted in the end of card 10 fits into the mating pin section which is mounted on hinge 66. Connector 68 serves no electrical function. Its sole purpose is to hold card 10 to hinge 66. Since the sole purpose of connector 68 is mechanical, an I/O connector (not shown) would serve as well the sixty-eight pin connector.

When in the open position as shown in FIG. 7, the screen and keyboard are accessible. That is, card 10 does not need to be separated from lid 64 when it is being used as a stand alone system. When in a closed position, lid 64 is attached to the top of card 10 by clip 70. Since both cover 64 and card 10 are rigid, when folded together, they make a sturdy carrying case that protects the screen and data entry keys. When it is time to have card 10 is in its host, connector 68 is merely separated which completely detaches card 10 from lid 64.

Alternatively, an entire case could be provided with a back portion (not shown in FIG. 7) fitting behind card 10 so that in the closed position, card 10 is completely surrounded by a case.

Figure 8:
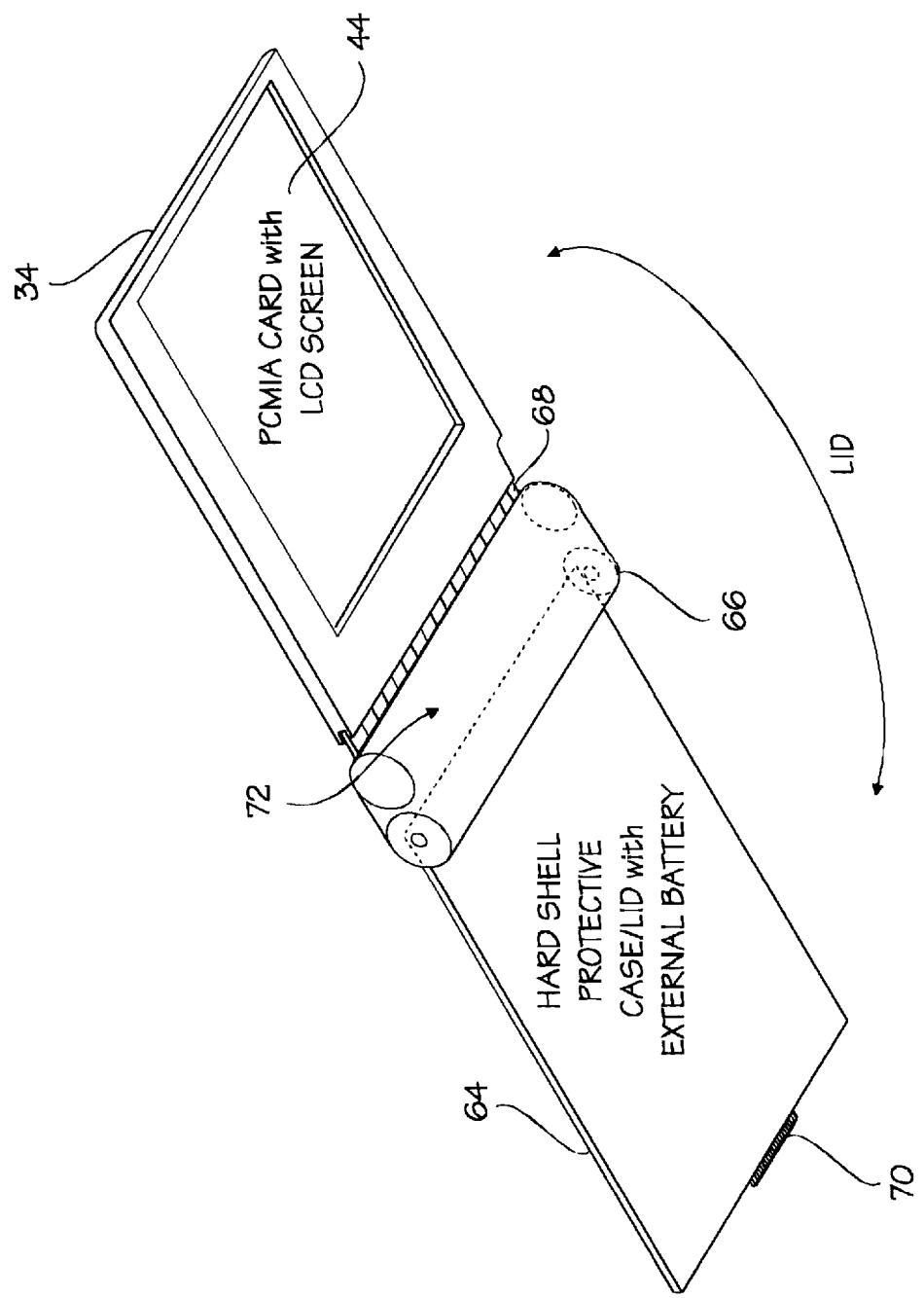
FIG. 8 is a perspective view of the case of FIG. 7 with an external battery capability.

FIG. 8 is a perspective view of the lid of FIG. 7 with an external battery capability. Referring now to FIG. 8, a battery compartment 72 is provided between hinge 66 and connector 64. Otherwise the lid arrangement of FIG. 8 is the same as that if FIG. 7. Battery compartment 72 while small in absolute terms, will accommodate a battery much larger than battery 26 located in card 10. For example, readily available AAA primary battery could be used. Such a battery would provide extended use while card 10 is away from the host. The external battery 72 could act as a portable power supply for charging internal battery 26 or bypass internal battery 26.

Lid arrangement 64 of FIG. 8 also provides a convenient housing for other capabilities such as a wireless modem or pager.

Figure 9:
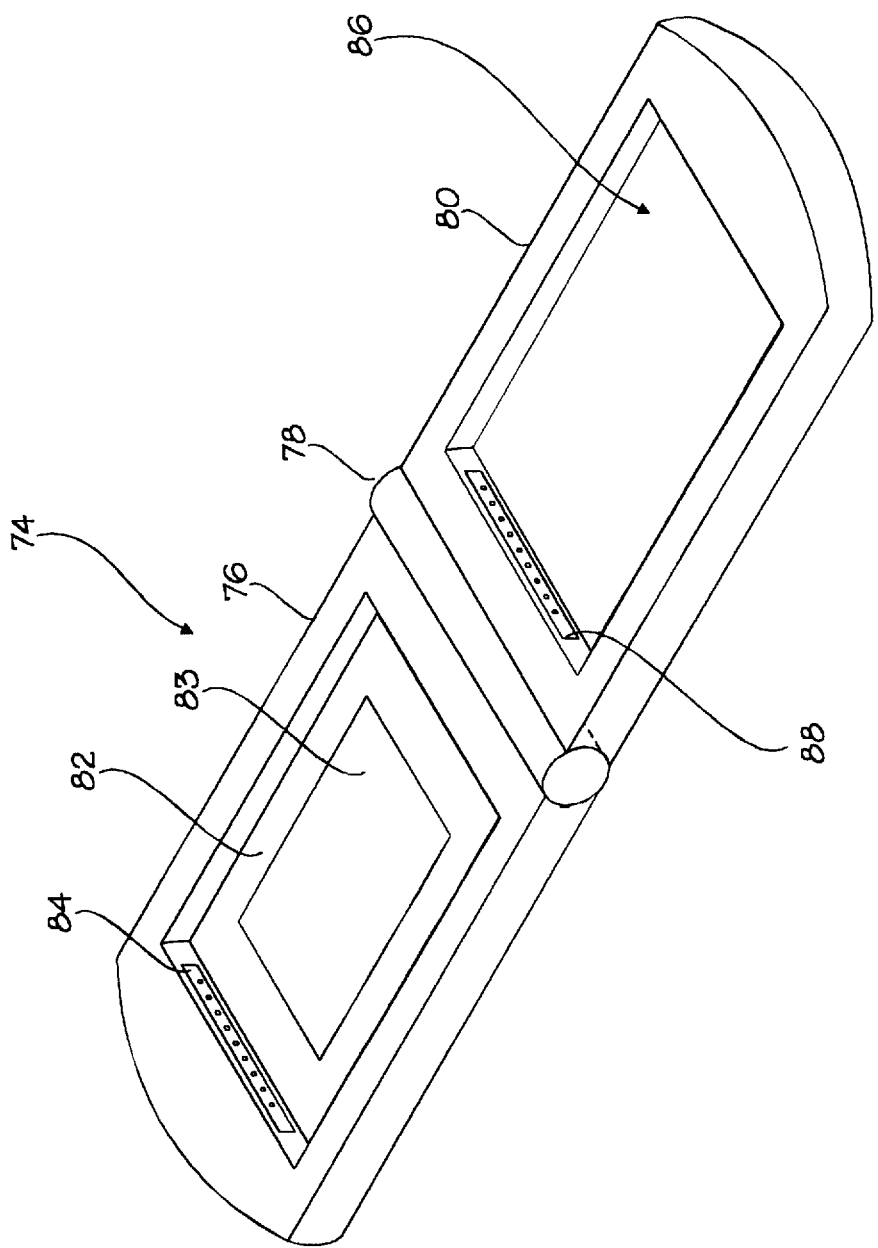
FIG. 9 is a perspective view of a combination carrying case and multi-card dock in the open position.

An alternative embodiment of a case is shown in FIG. 9. Referring now to FIG. 9, a case 74 consists of a first housing 76 connected by a hinge arrangement 78 to a second housing 80. First housing 76 contains a first bay 82 for holding PC card 10. First bay 82 contains a cut out window 83 through which a display and keyboard are accessible. At one edge of bay 82 is a plug 84 which is the mating interface for interface 12 of card 10. In this case it is a 68 pin PCMCIA plug. Second housing 80 contains a second bay 86 for holding a second card. In like manner, a connector socket of a second card would mate with plug 88. Plug 84 and plug 88 are wired together (not shown) so that card 10 and a second card can be electrically connected to form a more capable stand alone system than would be possible with a single card. A compartment for batteries is formed by hinge arrangement 78. Taken together, the arrangement of FIG. 9 forms a two card miniature dock and carrying case with power supply.

Figure 10:
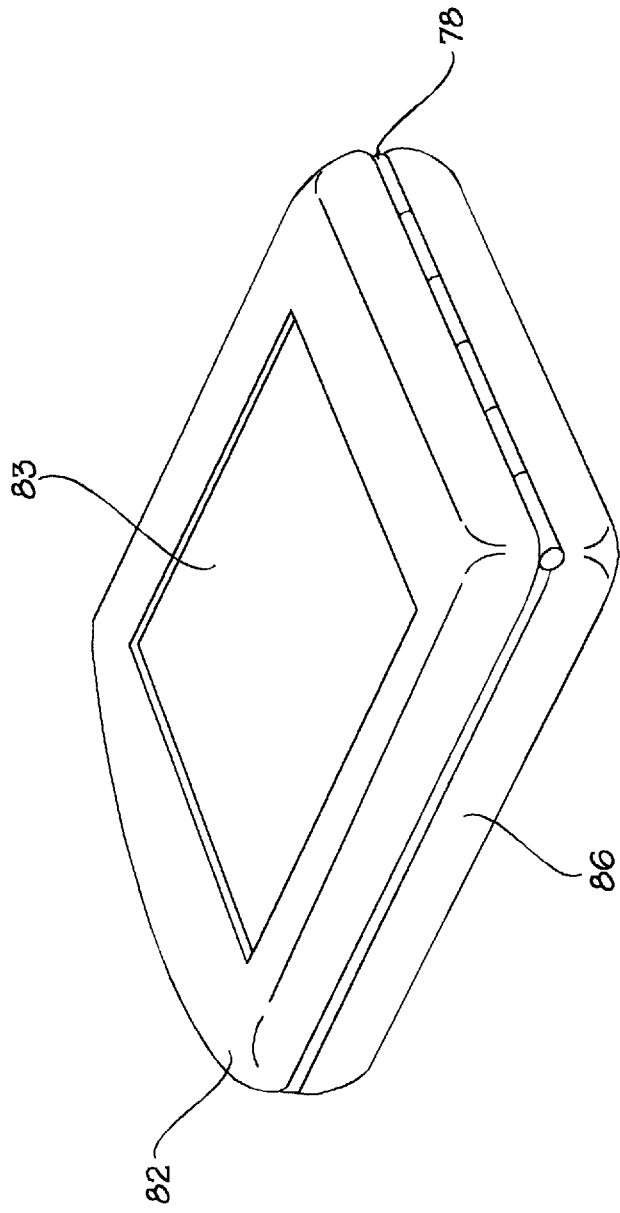
FIG. 10 is a perspective view of the combination carrying case and a multi-card dock of FIG. 9 in the closed position.

FIG. 10 is a perspective drawing of case 74 when it is closed. Common reference numerals in FIGS. 9 and 10 refer to the same elements.

The foregoing preferred embodiments are subject to numerous adaptations and modifications without departing from the concept of the invention. Therefore, within the scope of the appended claims, the invention may be practiced other than as specifically described herein.

What is claimed is:

1. A companion computer system on two or more PC cards wherein each of said two or more printed circuit cards (PC cards) includes an interface for electrically and mechanically connecting digital components, said comprising:

a first PC card conforming to said interface for electrically and mechanically connecting digital components;

a first bus located on said first PC card and electrically communicating with said interface;

a CPU located on said first PC card and connected to said first bus;

a display located on said first PC card and connected to said first bus;

an input device located on said first PC card and connected to said first bus;

a non-volatile memory module located on said first PC card and connected to said first bus;

a low power random access memory module located on said first PC card and connected to said first bus;

a power supply located on said first PC card and connected to the components of said PC card and supplying electrical energy thereto;

an operating system located in said non-volatile memory;

a second PC card conforming to said interface for electrically and mechanically connecting digital components;

a second bus located on said second PC card and electrically compatible with said first bus electrically communicating with said interface;

additional functional means on said second PC card and connected to said second bus;

a carrying case comprising:

a first bay for receiving said first PC card;

a second bay for receiving a second PC card:

hinge means for rotatably connecting said first and second bays, said hinge means forming a battery compartment for holding a battery that supplies power to at least one of said PC cards;

connector means located in said first and second bays for electrically connecting said first and second busses.

2. An apparatus comprising:

a first PC card having a first electrical connector and a first system bus connected thereto;

a second PC card having a second connector and a second system bus communicating connected thereto;

a case comprising:

a first bay for receiving said first PC card and including a third connector mating with said first connector;

a second bay for receiving a second PC card and including a fourth connector mating with said second connector, said third and fourth connectors being electrically interconnected; and a hinge for rotatably connecting said first and second bays, said hinge forming a battery compartment for holding a battery that supplies power to at least one of said first or second PC cards.

* * * * *